Patented June 22, 1926.

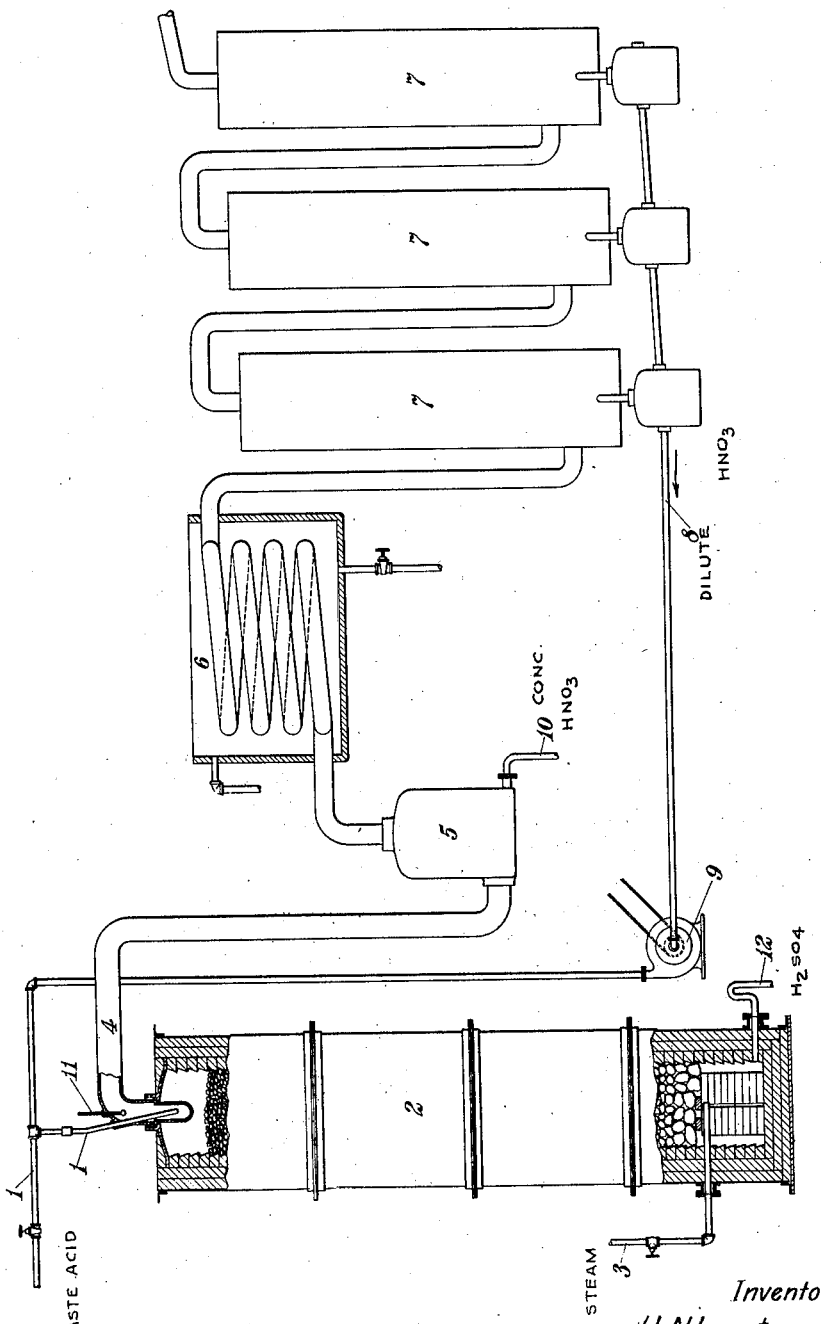

1,590,043

UNITED STATES PATENT OFFICE.

HOWARD N. LENTZ, OF GIBBSTOWN, NEW JERSEY, ASSIGNOR TO E. I. DU PONT DE NEMOURS & COMPANY, OF WILMINGTON, DELAWARE, A CORPORATION OF DELAWARE.

PRODUCTION OF CONCENTRATED NITRIC ACID FROM WASTE ACIDS.

Application filed December 20, 1921. Serial No. 523,622.

This invention relates to the denitration of waste acids which result from the nitration of certain organic compounds, and comprises a process and apparatus wherein the nitric acid is recovered in a highly concentrated form.

It is well known that one of the principal purposes of denitrating waste acids is usually to enable a subsequent separation of water to be made from either the resulting nitric acid, the resulting sulfuric acid, or both. For this reason, processes of denitration have in the past always been carried out with a view to obtaining as concentrated products as possible from the operation.

In denitrating a nitroglycerine waste acid, for example, which has the composition 72% $H_2SO_4$, 6% $HNO_3$, 2% $HNOSO_4$, 2% organic matter and 18% water, there is usually obtained a denitrated sulfuric acid containing about 74% $H_2SO_4$, while the nitric acid content of the waste acid is recovered as a nitric acid of at best about 70% $HNO_3$ and more usually of 55–60% $HNO_3$. And, moreover, no ordinary modifications of the process of denitration as usually carried out will appreciably better these results. It is true that by the use of superheated steam instead of ordinary live steam, or a mixture of superheated steam and air, somewhat higher concentrations can be obtained, but these concentrations will be of the order of magnitude just mentioned.

My new process may be described in general terms as follows: Waste acid, preferably that obtained in the manufacture of nitroglycerin, is passed downwardly through a denitrating column at the bottom of which steam is introduced to heat the acid and drive off nitrogen oxides and nitric acid vapors. The vapor mixture is led successively through bleaching, condensing, and absorbing devices, the gas leaving the latter consisting chiefly of nitrogen, with some oxygen, carbon monoxide, and carbon dioxide. The dilute nitric acid formed in the absorption device is then returned to the top of the denitrating column where the nitric acid is separated from the water. In the normal operation of this system, concentrated nitric acid will flow continuously from the bleaching device to storage.

By this process, and working with a typical nitroglycerine waste acid, I am able to obtain with no greater consumption of steam and with a reduction of the strength of the residual sulfuric acid to only about 70%, a nitric acid distillate, in substantially as good yield as before, of over 90% $HNO_3$ content. The difficulty of concentrating sulfuric acid from 70 to 74% is insignificant compared with that of concentrating nitric acid from 70% to 90%; my process therefore constitutes a distinct improvement in the art.

One form of apparatus embodying my invention and in which my new process may be conveniently carried out, is exemplified in the accompanying drawing, which shows diagrammatically a view of a side elevation with parts of the denitrating column and the condenser cut away.

The apparatus shown in the drawing comprises a denitrating column 2 preferably of the type described in U. S. Patent No. 1,292,948, provided at the top with an inlet 1 for acid to be denitrated, and at the bottom with an inlet 3 for steam and an outlet 12 for sulfuric acid. A bleaching tower 5, which may be filled with small perforated disks or cylinders, is connected at the bottom by pipe 4 with the top of the column 2, and at the top with a condenser 6, from the top of which a pipe leads to a series of absorption towers 7. The bottom of each of the absorption towers 7 communicates by a pipe 8 with a pump 9 adapted to pump liquid to the inlet 1 of the denitrating column. An outlet 10 is provided at the bottom of the tower 5 for withdrawing concentrated nitric acid. The apparatus is, of course, constructed of acid-resistant material as, for example, chemicalware, durion, etc.

My mode of operation is to pass the waste acid through pipe 1 into the top of the denitrating column 2, at the same time blowing live steam into the bottom of the tower through the inlet 3. The vapors issuing from the top of the tower through 4 are conducted upward through the small bleaching tower 5, through which passes downwardly the acid condensed in the condenser 6. The uncondensed vapors from the condenser, consisting largely of $NO_2$ with some NO and $HNO_3$, and any air which may have leaked into the system because of the slightly reduced pressure maintained therein, are passed to the series of countercurrent absorption towers 7, commonly used for this purpose, where by means of air and water they are converted to nitric acid, being delivered from this absorption system by the pipe 8 at a strength varying from 50-65% $HNO_3$ or higher.

This dilute nitric acid from the absorption system is then pumped, by means of the pump 9, back to the top of the denitrating tower, where it is run into the denitrating tower, through the pipe 1, with the spent acid which it is desired to denitrate. This spent acid contains sufficient $H_2SO_4$ to combine with the $H_2O$ of the dilute absorption tower acid to form non-volatile sulfuric acid hydrates under the conditions existing in the denitrating tower, thus permitting the $HNO_3$ content of this acid to be vaporized in a comparatively anhydrous condition from the top of the denitrating tower. This $HNO_3$, together with the small quantities of water which may have escaped from the denitrating tower, or which may have formed in the gases, after they have left the tower, through the occurrence of the reaction:

$$2HNO_3 + NO = 3NO_2 + H_2O$$

are condensed in the condenser, dissolving some nitrogen tetroxide ($NO_2$), and thence drain down through the bleaching tower where the $NO_2$ is again boiled out by the hot vapors rising therethrough, the condensate being finally delivered from the bottom of the bleacher, through the line 10, as a nitric acid of more than 90% $HNO_3$.

In carrying out my process, I find it desirable to maintain as low a temperature as possible at the top of the tower while still obtaining complete denitration of the sulfuric acid, say a temperature of about 210° F. on the thermometer 11, so regulating the supply of waste acid and the supply of steam that these conditions are constantly maintained. Thus, with a constant steam feed, increasing the feed of waste acid causes the temperature to be lowered, this going lower and lower with increasing acid feed until the acid issuing from the pipe 12 at the bottom of the tower is no longer completely denitrated. For most efficient operation, however, the acid feed is increased only to the maximum point possible while still obtaining completely denitrated acid in the bottom of the tower.

Waste acids to be denitrated by my invention with a good yield of ncentrated nitric acid, should have a nit. acid content greater than the nitrososulfuric acid content, and should be substantially free from aromatic compounds. Thu nitrocellulose waste acid, as well as the nitroglycerine waste acid mentioned above, may be denitrated with great advantage by my process, whereas the waste acid from trinitrotoluene manufacture, due to the preponderance of nitrososulfuric acid and to the presence of aromatic compounds, and particularly aromatic nitroderivatives, cannot be successfully treated. The unsuitability of the trinitrotoluene spent acid appears to be due to the excesive reduction of nitric acid which occurs at the top of the denitrating column, brought about in part by the aromatic compounds, and in part by the NO which is formed from the nitrososulfuric acid according to the equation:—

$$2HNOSO_4 + H_2O = 2H_2SO_4 + NO + NO_2.$$

The reaction of the NO with the nitric acid probably occurs in accordance with the equation:

$$NO + 2HNO_3 = 3NO_2 + H_2O.$$

Furthermore, at the high temperature prevailing at the top of the denitrating column, the reaction—

$$HNOSO_4 + HNO_3 \rightarrow H_2SO_4 + 2NO_2$$

will account for part of the reduction which occurs.

With waste acids of the type obtained in the production of trinitrotoluene, the reduction is so far-reaching that a considerable part of the nitric acid escapes from the system in the form of nitrogen and $N_2O$. It is therefore desirable to use in the present process waste acids free from aromatic compounds and in which the content of free nitric acid is two or more times that of the nitrososulfuric acid.

While I have shown and described one form of apparatus embodying my invention and have given a specific example of the way in which my new process may be performed, it will be understood that my invention is not limited thereto, but includes various changes in details in both said apparatus and said process.

I claim:—

1. The process which comprises subjecting a current of waste acid free from aromatic compounds and having more nitric acid than nitrososulfuric acid to a current of steam, the rate of flow of the steam being sufficient to effect complete denitration of said waste acid, passing the vapors arising from said waste acid thru concentrated nitric acid containing nitrogen tetroxide to remove said nitrogen tetroxide from said nitric acid, condensing the readily condensible portion of the vapors which have passed thru said nitric acid and subjecting the resulting condensate containing nitrogen tetroxide to the bleaching action of fresh vapors from said waste acid, bringing the other portion of said vapors which is not readily condensible into contact with water and oxygen to convert the nitrogen tetroxide present into dilute nitric acid, and finally adding said dilute nitric acid to the current of waste acid which is being subjected to a current of steam.

2. The process which comprises subjecting a current of waste acid free from aromatic compounds and having more nitric acid than nitrososulfuric acid to a current of steam, the rate of flow of the steam being sufficient to effect complete denitration of said waste acid, condensing the nitric acid portion of the vapors arising from said waste acid, separating the nitrogen tetroxide from the resulting condensate, converting the nitrogen tetroxide into dilute nitric acid, and returning the latter to the current of waste acid which is being subjected to a current of steam.

3. The continuous process of producing concentrated nitric acid from nitroglycerine waste acid which comprises subjecting a current of such waste acid to a counter current of steam, passing the vapors arising from said waste acid through concentrated nitric acid containing nitrogen tetroxide to remove the nitrogen tetroxide from said nitric acid, cooling the vapors which have passed through said nitric acid to form a condensate of concentrated nitric acid containing nitrogen tetroxide, continuously replenishing with said condensate the concentrated nitric acid from which nitrogen tetroxide is being removed, bringing the uncondensed portion of the above-mentioned vapors into contact with water and oxygen to convert the nitrogen tetroxide therein to dilute nitric acid, returning the latter to waste acid which is to be subjected to a current of steam, and continuously withdrawing from contact with the vapors arising from said waste acid the concentrated nitric acid from which nitrogen tetroxide has been removed.

4. A process as set forth in claim 1 above in which the waste acid used in nitroglycerin waste acid.

5. A process as set forth in claim 2 above in which the waste acid used is nitroglycerin waste acid.

In testimony whereof I affix my signature.

HOWARD N. LENTZ.